United States Patent
Sima et al.

(10) Patent No.: US 12,361,946 B1
(45) Date of Patent: Jul. 15, 2025

(54) SPEECH INTERACTION METHOD, SPEECH INTERACTION SYSTEM AND STORAGE MEDIUM

(71) Applicant: NANJING SILICON INTELLIGENCE TECHNOLOGY CO., LTD., Nanjing (CN)

(72) Inventors: Huapeng Sima, Nanjing (CN); Zhengkun Mei, Nanjing (CN); Yiping Tang, Nanjing (CN)

(*) Notice: Subject to any disclaimer, the term of this patent is extended or adjusted under 35 U.S.C. 154(b) by 0 days.

(21) Appl. No.: 19/021,033

(22) Filed: Jan. 14, 2025

(30) Foreign Application Priority Data

Aug. 5, 2024 (CN) .................. 202411059760.X

(51) Int. Cl.
*G10L 15/22* (2006.01)
*G10L 25/63* (2013.01)

(52) U.S. Cl.
CPC .............. *G10L 15/22* (2013.01); *G10L 25/63* (2013.01)

(58) Field of Classification Search
CPC ................................ G10L 15/22; G10L 25/63
See application file for complete search history.

(56) References Cited

U.S. PATENT DOCUMENTS

| 8,219,398 B2 * | 7/2012 | Marple | G10L 13/10 704/260 |
| 12,254,864 B1 * | 3/2025 | Lajszczak | G10L 15/22 |
| 2004/0019484 A1 * | 1/2004 | Kobayashi | G10L 13/02 704/258 |

(Continued)

FOREIGN PATENT DOCUMENTS

| BR | 102022009538 A2 * | 11/2023 | G10L 15/16 |
| CN | 110032742 A | 7/2019 | |

(Continued)

OTHER PUBLICATIONS

Rao, K. Sreenivasa, and B. Yegnanarayana. "Voice conversion by prosody and vocal tract modification." 9th International Conference on Information Technology (ICIT'06). IEEE, 2006. (Year: 2006).*

(Continued)

*Primary Examiner* — Paras D Shah
*Assistant Examiner* — Oluwadamilola M Ogunbiyi
(74) *Attorney, Agent, or Firm* — Schlee IP International, PC; Alexander R. Schlee; Pascal A. Schlee

(57) ABSTRACT

A speech interaction method, a speech interaction system and a storage medium. The method includes: receiving interactive speech input by a user; determining an emotional tag corresponding to the interactive speech based on the interactive speech and interactive text corresponding to the interactive speech; determining, based on the emotional tag, a response text corresponding to the interactive text, and a first prosodic feature and a second prosodic feature corresponding to the response text. The first prosodic feature is used for characterizing the whole sentence prosodic feature of the response text, and the second prosodic feature is used for characterizing a local prosodic feature of each character in the response text; and generating and outputting a response speech corresponding to the interactive speech based on the response text, the first prosodic feature and the second prosodic feature.

17 Claims, 6 Drawing Sheets

(56) References Cited

U.S. PATENT DOCUMENTS

| | | | | |
|---|---|---|---|---|
| 2008/0255830 | A1* | 10/2008 | Rosec | G10L 21/04 |
| | | | | 704/E21.017 |
| 2010/0312565 | A1* | 12/2010 | Wang | G10L 13/00 |
| | | | | 704/260 |
| 2014/0278376 | A1* | 9/2014 | Yoon | G09B 19/04 |
| | | | | 434/167 |
| 2017/0206913 | A1* | 7/2017 | Nahman | G10L 21/007 |
| 2017/0365256 | A1* | 12/2017 | Stylianou | G10L 21/057 |
| 2018/0133900 | A1* | 5/2018 | Breazeal | B25J 19/026 |
| 2019/0371302 | A1* | 12/2019 | Watanabe | G06F 40/211 |
| 2021/0319780 | A1* | 10/2021 | Aher | G10L 13/0335 |
| 2022/0375454 | A1* | 11/2022 | Kennedy | G10L 15/01 |
| 2023/0134970 | A1* | 5/2023 | Rasipuram | G10L 13/033 |
| | | | | 704/9 |
| 2023/0215421 | A1* | 7/2023 | Calapodescu | G06F 40/284 |
| | | | | 704/259 |
| 2023/0252972 | A1* | 8/2023 | Harazi | G10L 25/63 |
| | | | | 704/259 |
| 2024/0069858 | A1* | 2/2024 | Bolzoni | G06F 3/167 |
| 2024/0363125 | A1* | 10/2024 | Khoury | G10L 17/26 |

FOREIGN PATENT DOCUMENTS

| | | | |
|---|---|---|---|
| CN | 111435597 | A | 7/2020 |
| CN | 114005428 | A | 2/2022 |
| CN | 114283781 | A | 4/2022 |
| CN | 116364085 | A | 6/2023 |
| CN | 116434730 | A | 7/2023 |
| CN | 116913323 | A | 10/2023 |
| CN | 117219052 | A | 12/2023 |
| CN | 117496940 | A | 2/2024 |
| CN | 118280343 | A | 7/2024 |
| WO | WO-2022249362 | A1 * | 12/2022 |
| WO | 2023116243 | A1 | 6/2023 |

OTHER PUBLICATIONS

Rao, Krothapalli Sreenivasa. "Real time prosody modification." Journal of Signal and Information Processing 1.01 (2010): 50. (Year: 2010).*

Dominguez, Mónica, Mireia Farrús, and Leo Wanner. "A thematicity-based prosody enrichment tool for cts." Proceedings of interspeech: Show and tell demonstrations (2017): 3421-2. (Year: 2017).*

Sailunaz, Kashfia, et al. "Emotion detection from text and speech: a survey." Social Network Analysis and Mining 8.1 (2018): 28. (Year: 2018).*

Osses, Alejandro, et al. "Prosodic cues to word boundaries in a segmentation task assessed using reverse correlation." JASA Express Letters 3.9 (2023). (Year: 2023).*

Ying Shang et al., Personalized Speech Synthesis Based on Separated Contrastive Learning, Computer Engineering and Applications, 2023, pp. 158-165, vol. 59, issue 22, China.

* cited by examiner

SPEECH INTERACTION METHOD, SPEECH INTERACTION SYSTEM AND STORAGE MEDIUM

CROSS-REFERENCE TO RELATED APPLICATION

The present disclosure claims priority to Chinese Patent Application No. 202411059760.X, filed on Aug. 5, 2024, entitled "speech interaction method, speech interaction system and storage medium", which is incorporated herein by reference in its entirety.

FIELD OF THE PRESENT DISCLOSURE

The present disclosure relates to the technical field of computers, and more particularly to a speech interaction method, a speech interaction system and a storage medium.

BACKGROUND OF THE PRESENT DISCLOSURE

In recent years, with the progress of artificial intelligence technology, the technology of human-computer interaction through an intelligent dialogue system has been rapidly developed. The intelligent dialogue system may generate and output a response text to the interactive text or output a response speech to the interactive speech after recognizing and processing the interactive text or the interactive speech input by the user.

However, the existing intelligent dialogue systems generally do not recognize emotion of a user according to the interactive text or the interactive speech well, and do not control the degree of emotional change of the generated response speech, thereby not facilitating the emotional exchange with the user.

SUMMARY OF THE PRESENT DISCLOSURE

In order to solve the above-mentioned problems, embodiments of the present disclosure provide a speech interaction method, which may improve the accuracy of emotion classification of interactive speech and may improve the emotional richness and naturalness of generated response speech. Specifically, the embodiments of the present disclosure disclose the following technical solutions:

According to a first aspect of an embodiment of the present disclosure, there is provided a speech interaction method including: receiving interactive speech input by a user; determining an emotional tag corresponding to the interactive speech based on the interactive speech and an interactive text corresponding to the interactive speech; determining, based on the emotional tag, a response text corresponding to the interactive text, and a first prosodic feature for characterizing the whole sentence prosodic feature of the response text and a second prosodic feature for characterizing a local prosodic feature of each character in the response text; and generating and outputting a response speech corresponding to the interactive speech based on the response text, the first prosodic feature and the second prosodic feature.

In some embodiments, the determining the emotional tag corresponding to the interactive speech based on the interactive speech and interactive text corresponding to the interactive speech includes: determining a text emotional feature based on the interactive speech and the interactive text, and determining a speech emotional feature based on the interactive speech; and determining the emotional tag based on the text emotional feature and the speech emotional feature.

In some embodiments, the determining text emotional feature based on the interactive speech and the interactive text includes: processing the interactive speech based on a first emotional feature extraction model to obtain a whole sentence emotional feature; processing the interactive text based on a second emotional feature extraction model to obtain a character emotional feature; and determining the text emotional feature based on the whole sentence emotional feature and the character emotional feature.

In some embodiments, the determining the speech emotional feature based on the interactive speech includes: processing the interactive speech based on a first emotional feature extraction model to obtain an implicit speech emotional feature; processing the interactive speech based on a third emotional feature extraction model to obtain an explicit speech emotional feature; and determining the speech emotional feature based on the implicit speech emotional feature and the explicit speech emotional feature.

In some embodiments, the determining, based on the emotional tag, the response text corresponding to the interactive text, and the first prosodic feature and the second prosodic feature corresponding to the response text includes: generating the response text corresponding to the emotional tag based on the emotional tag; processing the response text and the emotional tag based on a first prosodic predictive model and an overall prosodic change parameter to obtain the first prosodic feature; and processing the response text and the first prosodic feature based on a second prosodic predictive model and a local prosodic change parameters to obtain the second prosodic feature.

In some embodiments, the processing the response text and the emotional tag based on the first prosodic predictive model and the overall prosodic change parameter to obtain the first prosodic feature includes: encoding the emotional tag to obtain a whole sentence prosodic feature corresponding to the response text; and performing noise-reducing processing on the whole sentence prosodic feature based on the first prosodic predictive model and the overall prosodic change parameter to obtain the first prosodic feature.

In some embodiments, the above method further includes: performing noise-adding processing on a sample whole sentence prosodic feature based on the first prosodic predictive model and the overall prosodic change parameter to obtain a noise-added sample whole sentence prosodic feature; performing noise-reducing processing based on the overall prosodic change parameter and the noise-added sample whole sentence prosodic feature to obtain a noise-reduced sample whole sentence prosodic feature; determining a whole sentence prosodic loss function corresponding to the first prosodic predictive model based on the sample whole sentence prosodic feature and the noise-reduced sample whole sentence prosodic feature; and optimizing the whole sentence prosodic loss function based on a first optimization parameter of the whole sentence prosodic loss function.

In some embodiments, the processing the response text and the first prosodic feature based on the second prosodic predictive model and the local prosodic change parameter to obtain the second prosodic feature includes: encoding the response text based on an encoder to obtain a response text feature; fusing the first prosodic feature and the response text feature to obtain a fused text feature as a response text feature including the first prosodic feature; processing the fused text feature based on the random prosodic predictor in the second prosodic predictive model and the local prosodic change parameter to obtain the random prosodic feature corresponding to the fused text feature, wherein the random prosodic feature includes a random fundamental frequency feature, a random energy feature and a random duration feature; processing the fused text feature based on a fixed prosodic predictor in the second prosodic predictive model to obtain a fixed prosodic feature corresponding to the fused text feature, wherein the fixed prosodic feature includes a fixed fundamental frequency feature, a fixed energy feature and a fixed duration feature; and determining the second prosodic feature based on the random prosodic feature, the fixed prosodic feature and a control coefficient.

In some embodiments, the processing the fused text feature based on a random prosodic predictor in the second prosodic predictive model and the local prosodic change parameter to obtain a random prosodic feature corresponding to the fused text feature includes: performing noise-adding processing on the fused text feature based on the random prosodic predictor and the local prosodic change parameter to obtain a noise-added fused text feature; and performing noise-reducing processing on the noise-added fused text feature based on the random prosodic predictor and the local prosodic change parameter to obtain the random prosodic feature.

In some embodiments, the processing the fused text feature based on a random prosodic predictor in the second prosodic predictive model and the local prosodic change parameter to obtain a random prosodic feature corresponding to the fused text feature includes: processing the fused text feature based on a random fundamental frequency predictor in the random prosodic predictor and the local prosodic change parameter to obtain the random fundamental frequency feature; processing the fused text feature and the random fundamental frequency feature based on a random energy predictor in the random prosodic predictor and the local prosodic change parameter to obtain the random energy feature; processing the fused text feature, the random fundamental frequency feature and the random energy feature based on a random duration predictor in the random prosodic predictor and the local prosodic change parameter to obtain the random duration feature; and determining the random prosodic feature based on the random fundamental frequency feature, the random energy feature, and the random duration feature.

In some embodiments, the control coefficient includes a first control coefficient and a second control coefficient, and wherein the determining the second prosodic feature based on the random prosodic feature, the fixed prosodic feature and the control coefficient includes: determining the second prosodic feature based on the first control coefficient for determining weight of the random prosodic feature, the second control coefficient for determining weight of the fixed prosodic feature, the random prosodic feature and the fixed prosodic feature.

In some embodiments, the above method further includes: acquiring a sample response speech; acquiring sample fundamental frequency information, sample energy information and sample duration information corresponding to the sample response speech, and encoding the sample fundamental frequency information, the sample energy information and the sample duration information to obtain a sample local prosodic feature including a sample fundamental frequency feature, a sample energy feature and a sample duration feature; determining a random prosodic loss function corresponding to the random prosodic predictor based on the sample local prosodic feature and the random prosodic feature, and optimizing the random prosodic predictor based on a second optimization parameter of the random prosodic loss function including a random fundamental frequency loss function, a random energy loss function and a random duration loss function; and determining a fixed prosodic loss function corresponding to the fixed prosodic predictor based on the sample local prosodic feature and the fixed prosodic feature, and optimizing the fixed prosodic predictor based on a third optimization parameter of the fixed prosodic loss function including a fixed fundamental frequency loss function, a fixed energy loss function and a fixed duration loss function.

In some embodiments, the encoding the response text based on an encoder to obtain a response text feature includes: encoding the response text based on a first encoder to obtain a character-level feature corresponding to the response text; encoding the response text based on a second encoder to obtain a phoneme-level feature corresponding to the response text; and encoding a feature obtained by adding the character-level feature and the phoneme-level feature based on a third encoder to obtain the response text feature.

In some embodiments, the generating and outputting a response speech corresponding to the interactive speech based on the response text, the first prosodic feature and the second prosodic feature includes: determining a speech feature based on the first prosodic feature, the second prosodic feature and the response text feature; and generating and outputting the response speech based on the speech feature.

In some embodiments, after the receiving the interactive speech input by the user, the method further includes: performing speech recognition processing on the interactive speech to obtain the interactive text corresponding to the interactive speech; wherein after the determining the emotional tag corresponding to the interactive speech, the method further includes: processing the interactive text based on a language model to obtain the response text corresponding to the interactive text.

According to a second aspect of an embodiment of the present disclosure, there is provided a speech interaction system including: an input module configured to receive interactive speech input by a user; an emotion classification module configured to determine an emotional tag corresponding to the interactive speech based on the interactive speech and an interactive text corresponding to the interactive speech; a prosodic prediction module configured to determine, based on the emotional tag, a response text corresponding to the interactive text, and a first prosodic feature for characterizing the whole sentence prosodic feature of the response text and a second prosodic feature for characterizing a local prosodic feature of each character in the response text; and an output module configured to generate and output a response speech corresponding to the interactive speech based on the response text, the first prosodic feature and the second prosodic feature.

According to a third aspect of an embodiment of the present disclosure, there is provided a computer-readable storage medium storing computer program instructions thereon which, when read by a computer, perform the speech interaction method of the preceding first aspect.

According to a fourth aspect of an embodiment of the present disclosure, there is provided a computer program product including a computer program stored on a non-transitory computer-readable storage medium, the computer program including program instructions which, when executed by a computer, cause the computer to perform the speech interaction method according to the preceding first aspect.

In a speech interaction method provided in an embodiment of the present disclosure, after receiving interactive speech input by a user; determining an emotional tag corresponding to the interactive speech based on the interactive speech and interactive text corresponding to the interactive speech; and determining, based on the emotional tag, the response text corresponding to the interactive text, and the first prosodic feature for characterizing the whole sentence prosodic feature of the response text and the second prosodic feature for characterizing a local prosodic feature of each character in the response text, then generating and outputting a response speech corresponding to the interactive speech based on the response text, the first prosodic feature and the second prosodic feature.

With application of the technical solution provided in the present disclosure, an emotional tag corresponding to an interactive speech is determined based on two modalities of the interactive speech and the interactive text, which may improve the accuracy rate of performing emotion classification on the interactive speech input by a user; and determining the whole sentence prosodic feature corresponding to the response text and the local prosodic feature of each character according to the emotional tag may improve the emotional richness and naturalness of the generated response speech.

BRIEF DESCRIPTION OF THE DRAWINGS

In order to explain the embodiments of the present disclosure more clearly, a brief description of the drawings which need to be used in the embodiments will be given below. It is obvious for those skilled in the art that the drawings in the following description are only some embodiments of the present disclosure, and it would have been obvious for a person skilled in the art to obtain other drawings according to these drawings without involving any inventive effort.

DESCRIPTION OF THE EMBODIMENTS

In order to make the technical solutions in the embodiments of the present disclosure better understood and make the above objects, features and advantages of the embodiments of the present disclosure more obvious and understandable, the technical solutions in the embodiments of the present disclosure are further described in detail below with reference to the accompanying drawings.

In an existing intelligent dialogue system, there are several problems:

1. Some existing intelligent dialogue systems only support responses in the form of text, lack of effective use of speech, and poor emotional intervention and conciliatory functions for the user. At the same time, responding to the user's interactive text or interactive speech based on knowledge map and database will lead to the generated response text being not vivid, and it is difficult to exert the advantages of diversified response and emotional response of artificial intelligence.

2. Some existing intelligent dialogue systems only rely on single-modality information (i.e. text information or speech information) to judge and classify the user's emotion, resulting in large errors in classification results.

3. Some existing intelligent dialogue systems usually use a VITS model (Conditional Variational Autoencoder with Adversarial Learning for End-to-End Text-to-Speech) to predict the prosodic feature of the response text when generating the response speech, and generate the response speech based on the response text and the prosodic feature. However, the VITS model lacks fine-grained modeling of the prosodic feature, and the prosody of the response speech generated from the same response text is exactly the same, which may not control the emotional changes of the response speech and thus is not conducive to emotional exchange with users.

Based on the above-mentioned technical problem, the present disclosure provides a speech interaction method, a speech interaction system and a storage medium capable of performing speech interaction with a user; and may improve the accuracy of emotion classification of the interactive speech input by the user; it is also possible to control the emotional change of the output response speech and improve the emotional richness and naturalness of the response speech.

The speech interaction method provided in the present disclosure will be described in detail with reference to the accompanying drawings.

Figure 1:
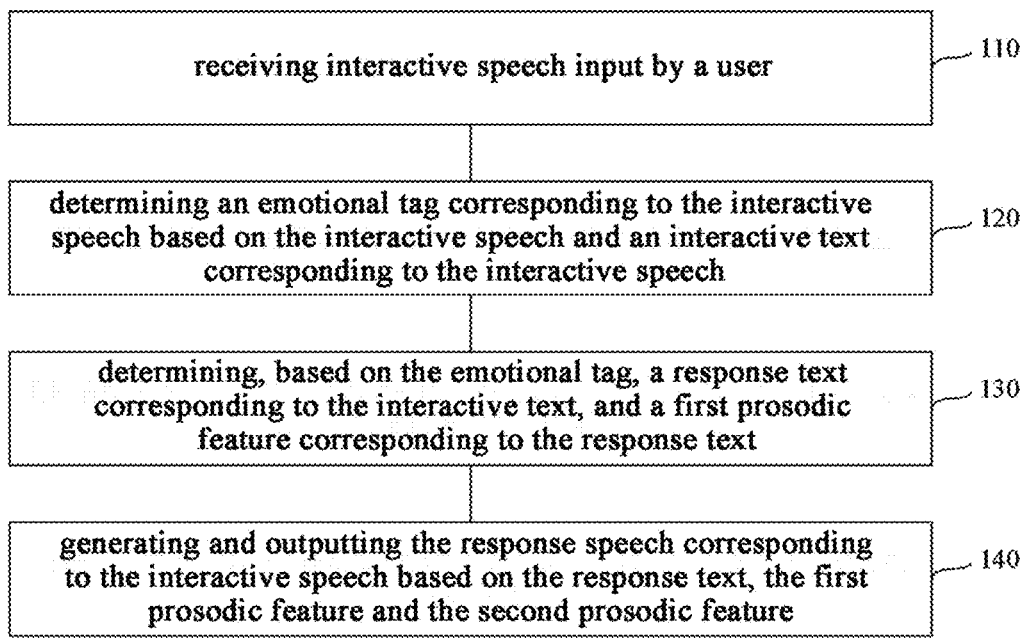
FIG. 1 is a flow diagram showing a speech interaction method according to some embodiments of the present disclosure.
Figure 2:
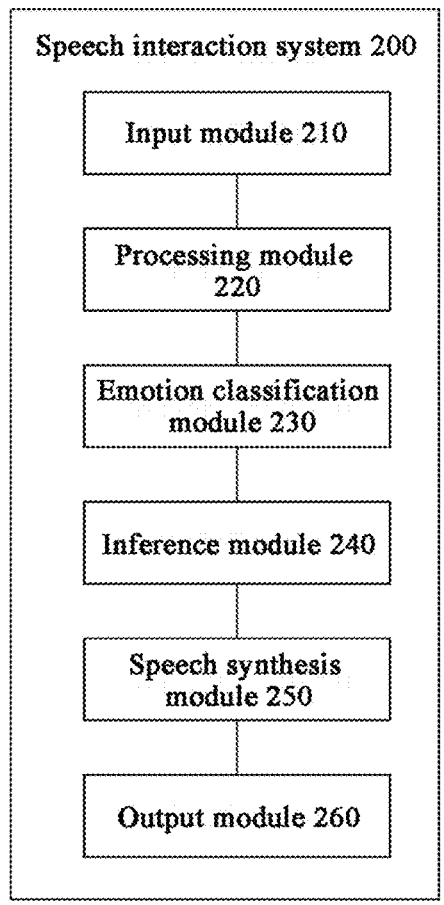
FIG. 2 is a schematic diagram showing a speech interaction system according to some embodiments of the present disclosure.

FIG. 1 is a flow chart of a speech interaction method according to some embodiments of the present disclosure, and FIG. 2 is a speech interaction system according to some embodiments of the present disclosure. The speech interaction method shown in FIG. 1 may be implemented by the speech interaction system 200 shown in FIG. 2. As shown in FIG. 1, the speech interaction method may include steps 110 through 140.

Step 110: receiving interactive speech input by a user.

In some embodiments, as shown in FIG. 2, the speech interaction system 200 includes an input module 210, a processing module 220, an emotion classification module 230, an inference module 240, a speech synthesis module 250, and an output module 260.

In some embodiments, a user may input interactive speech to the speech interaction system 200 which may obtain the interactive speech through the input module 210 therein and send the interactive speech to the processing module 220.

Step 120: determining an emotional tag corresponding to the interactive speech based on the interactive speech and an interactive text corresponding to the interactive speech.

In some embodiments, the processing module 220 may perform speech recognition processing on the interactive speech to convert the interactive speech into corresponding text information (i.e., interactive text). Illustratively, the processing module 220 may perform speech recognition processing on the interactive speech based on a speech recognition model, and the type of the speech recognition model is not limited in the embodiment of the present disclosure.

In some embodiments, after the processing module 220 obtains the interactive text, the emotion classification module 230 acquires the interactive text and the interactive speech, and determines a text emotional feature based on the interactive speech and the interactive text, and determines a speech emotional feature based on the interactive speech; thus, the emotion of the user is classified through two modalities, i.e., a text emotional feature and a speech emotional feature, i.e., an emotional tag corresponding to an interactive speech is determined.

Figure 3:
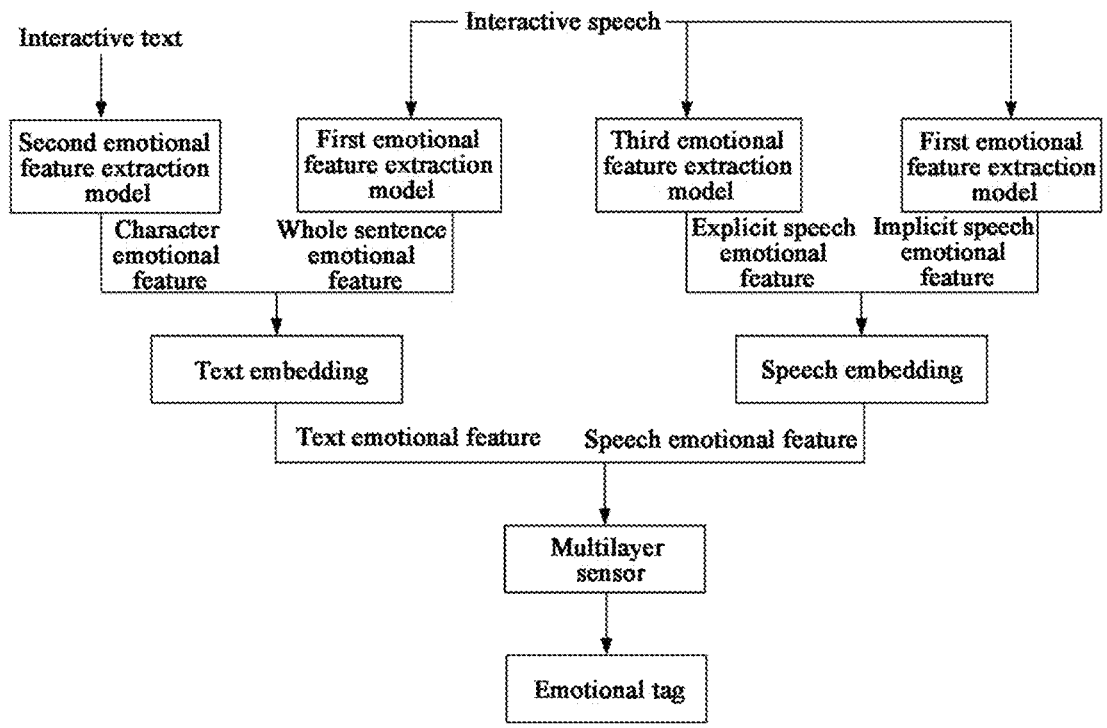
FIG. 3 is a schematic diagram showing an emotion classification module according to some embodiments of the present disclosure.

FIG. 3 is a schematic diagram showing an emotion classification module according to some embodiments of the present disclosure. As shown in FIG. 3, after acquiring an interactive speech and an interactive text, the emotion classification module 230 may extract an emotional feature of the interactive speech via a first emotional feature extraction model so as to obtain an emotional feature of 512 dimensions, wherein the emotional feature is strongly related to the emotion of the interactive text, and may be used as a feature of the interactive text in a sentence dimension, i.e., an whole sentence emotional feature of the interactive text; and the emotional feature of the interactive text is extracted through the second emotional feature extraction model so as to obtain the feature of the interactive text in the character dimension, i.e., the character emotional feature of the interactive text. Then, the whole sentence emotional feature and the character emotional feature of the obtained interactive text are combined to constitute the features of the text modality, i.e., emotional feature fusion is performed on the whole sentence emotional feature and the character emotional feature at a text_embedding so as to obtain the text emotional feature.

The first emotional feature extraction model may be a Wav2Vec-2.0 model, etc. and the second emotional feature extraction model may be MegatronBert, etc. and the specific types of the first emotional feature extraction model and the second emotional feature extraction model are not limited in the embodiments of the present disclosure.

Meanwhile, the emotion classification module 230 may extract the implicit emotional feature of the interactive speech through the first emotional feature extraction model; the third emotional feature extraction model is used to extract the explicit speech emotional feature emotional feature of the interactive speech. The third emotional feature extraction model may extract Mel-Frequency Cepstral Coefficients (MFCC) of the interactive speech, and take the MFCC feature of the interactive speech as the explicit speech emotional feature of the interactive speech.

Figure 4:
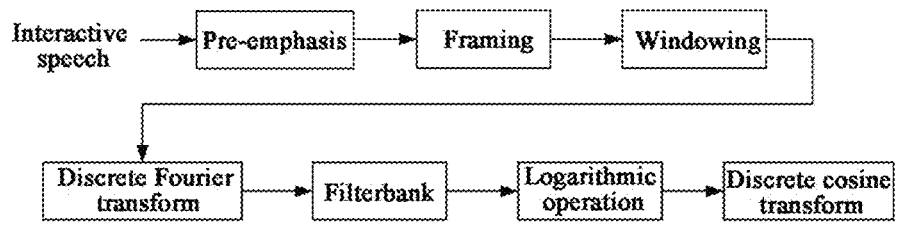
FIG. 4 is a schematic diagram showing extraction of an MFCC feature according to some embodiments of the present disclosure.

FIG. 4 is a schematic diagram showing extraction of the MFCC feature according to some embodiments of the present disclosure. As shown in FIG. 4, when extracting the MFCC feature of the interactive speech, the interactive speech may first be pre-emphasized, i.e., the high-frequency part in the interactive speech is enhanced through a high-pass filter, so that the spectrum may be balanced and the signal-to-noise ratio may be improved. Reference may be made to formula (1) for the formula of the transfer function of the high-pass filter:

$$y(t)=x(t)-\alpha x(t-1) \qquad (1)$$

wherein t is a time; x(t) is a speech sample value corresponding to the time t; x(t−1) is a speech sample value corresponding to a time t−1; y(t) is a pre-emphasis result corresponding to the time t; and a is a pre-emphasis factor, the value is usually within a range of [0.9, 1.0].

Then, after pre-emphasis is performed on the interactive speech, frame division processing is performed on the interactive speech, i.e., dividing the interactive speech into a plurality of short-time window frames. After performing frame division on the interactive speech, each frame of the interactive speech is windowed using a window function to increase frame-to-frame continuity and reduce spectrum leakage. For example, each frame of interactive speech may be windowed using a Hamming Window, and reference may be made to formula (2) for the Hamming window function:

$$\omega(n) = 0.54 - 0.46\cos\left(\frac{2\pi n}{N-1}\right) \qquad (2)$$

wherein N is a length of the window, n is a position of each sample point in the window, and ω(n) is a value of the Hamming window function at a sample point n.

After windowing, each frame of the windowed interactive speech is subjected to a Discrete Fourier Transform (DFT) to convert a time domain signal into a frequency domain signal. In the frequency domain, the spectrum feature of the interactive speech is extracted by Mel Filterbank, such that the extracted feature complies more with perceptual characteristics of a human auditory system, thereby providing strong support for emotion classification. Then, a logarithmic operation is performed on the spectrum feature obtained after passing through the Mel Filterbank to obtain a spectrum feature after taking the logarithm. Finally, Dual-Clutch Transmission (DCT) is performed on the spectrum feature after taking the logarithm to obtain the MFCC feature of the interactive speech.

In some embodiments, after obtaining an implicit speech emotional feature and an explicit speech emotional feature of an interactive speech, the implicit speech emotional feature and the explicit speech emotional feature together constitute a feature of a speech modality, i.e., performing emotional feature fusion on the implicit speech emotional feature and the explicit speech emotional feature at a Speech embedding so as to obtain a speech emotional feature.

Then, the emotion classification module 230 may fuse the obtained text emotional feature and speech emotional feature via a Multilayer Perceptron (MLP), and perform emotion classification on the interactive speech according to the fused emotional feature, thereby obtaining an emotional tag corresponding to an emotional type of the interactive speech. For example, the emotional tag may include: positive, negative, neutral, angry, sad, joyful, horrible, surprising, aversive, etc.

With the above-mentioned solution, by using the two modalities of interactive text and interactive speech at the same time, not only the emotional features corresponding to the two modalities may be determined, but also the emotional features may be determined and the emotion classification may be performed by combining the interactive information of the two modalities and the corresponding relationship between the potential space, so that the emotional feature of the user may be captured more comprehensively and the accuracy of the emotion classification may be improved.

Step 130: determining, based on the emotional tag, a response text corresponding to the interactive text, and a first prosodic feature corresponding to the response text.

In some embodiments, after classifying the emotional feature of the interactive speech and the interactive text and determining the emotional tag, a response content (i.e., a response text) to the interactive text may be generated based on the emotional tag and the interactive text, and a first prosodic feature corresponding to the response text is determined based on the emotional tag and the response text, and a second prosodic feature corresponding to the response text is determined based on the response text and the first prosodic feature.

Figure 5:
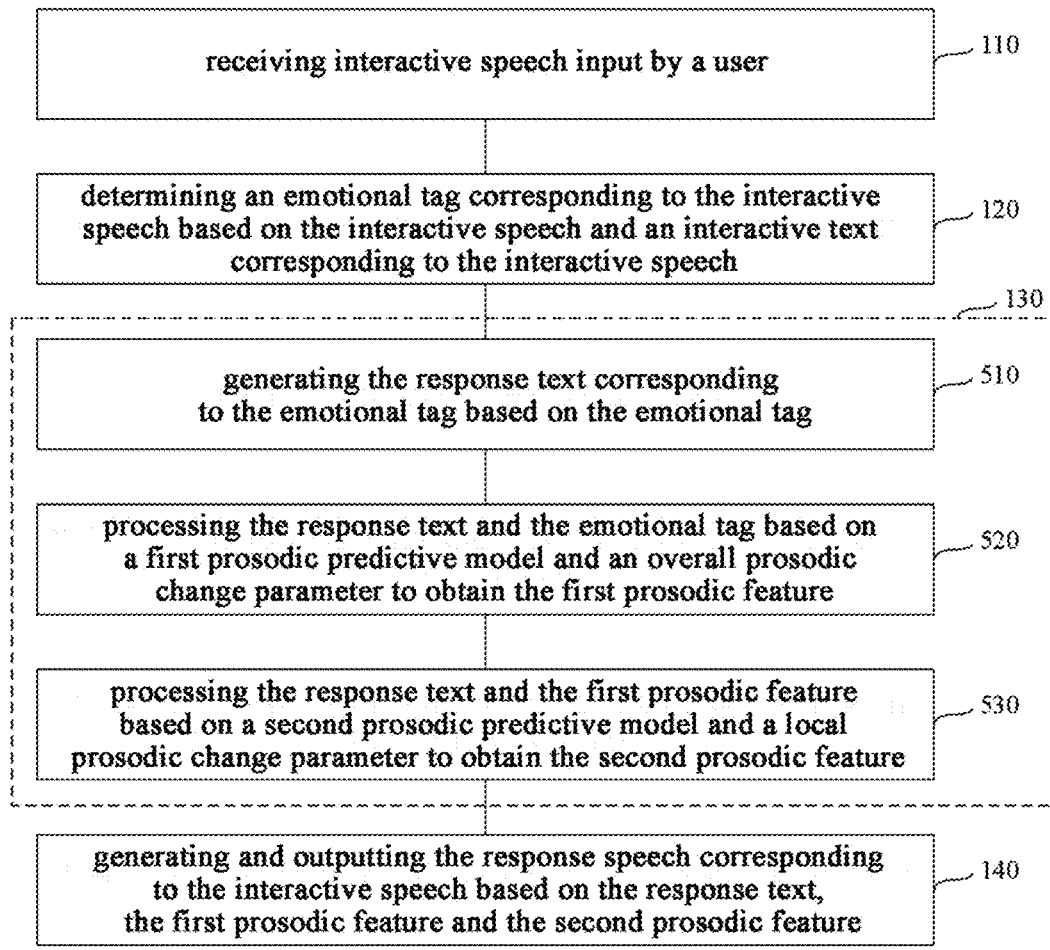
FIG. 5 is a flow diagram showing another speech interaction method according to some embodiments of the present disclosure.

FIG. 5 is a flow diagram showing another speech interaction method according to some embodiments of the present disclosure. As shown in FIG. 5, the step 130 described above may include steps 510 through 530.

Step 510: generating the response text corresponding to the emotional tag based on the emotional tag.

In some embodiments, after classifying the emotional feature of the interactive speech and the interactive text and determining the emotional tag, an inference module 240 may generate a response content (i.e., a response text) to the interactive text based on the emotional tag and the interactive text.

Illustratively, the inference module 240 may process the interactive text using the language model and generate interactive text that corresponds to the user's emotions corresponding to the emotional tags. For example, the language model may consist of a main model, such as a ChatGLM model, and a fine-tuning model, such as a Low-Rank Adaptation of Large Language Models (LoRA) fine-tuning model. If persuasion and conciliatory of the user's negative emotions is required, the language model may be trained using the psyQA and/or efaqa Psychological Consultation Corpus to generate a LoRA fine-tuning model for psychological aspects. The inference module 240 may load a ChatGLM model first, then load the LoRA fine-tuning model, and replace the parameters of the ChatGLM model with the parameters of the LoRA model, so as to make the response text output by the language model more in line with the language style of the psychological consultant. Finally, the interactive text is input into the ChatGLM model after parameter replacement, and the ChatGLM model outputs the response text corresponding to the interactive text after inference.

Step 520: processing the response text and the emotional tag based on a first prosodic predictive model and an overall prosodic change parameter to obtain the first prosodic feature.

In some embodiments, after determining the response text, a speech synthesis module 250 may generate a response speech corresponding to the user's emotion corresponding to the emotional tag based on the emotional tag and the response text. For example, if the emotional tag corresponding to the interactive speech input by the user is negative, i.e., the emotion of the user is negative emotion, the generated response speech may be of a conciliatory tone; if the emotional tag corresponding to the interactive speech input by the user is positive, i.e. the emotion of the user is positive emotion, the generated response speech may be of a positive and a favorable tone.

Illustratively, when generating a response speech, not only a prosody of the whole sentence of the response speech (i.e., the prosody of the text-level) but also a local prosody of the response speech (i.e., the prosody of each character in the response speech) may be adjusted, so that the generated response speech may have both a unified emotional style as a whole and subtle emotional change in each local region.

Figure 6:
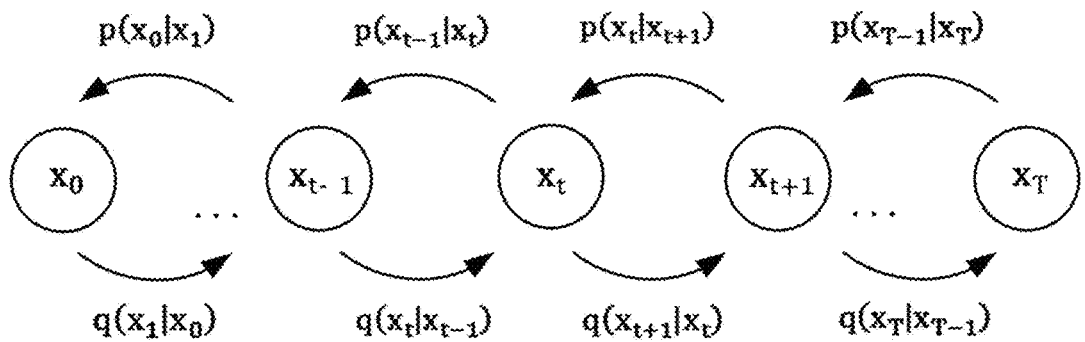
FIG. 6 is a schematic diagram showing a diffusion model according to some embodiments of the present disclosure.

In some embodiments, the speech synthesis module 250 includes a first prosodic predictive model, i.e., a text-level prosodic predictor, that may be used to determine the first feature of the response speech (i.e., the text-level whole sentence prosodic feature). The text-level prosodic predictor may be constructed based on a diffusion model (Denoising Diffusion Probabilistic Models, DDPM). FIG. 6 is a schematic diagram showing a diffusion model according to some embodiments of the present disclosure. As shown in FIG. 6, the diffusion model is a generation model based on a forward noise-adding process and a reverse noise-reducing process. The forward noise-adding process gradually converts a feature $x_0$ into one white noise $x_T$ through a Markov chain, and the reverse noise-reducing process gradually converts the white noise $x_T$ into the feature $x_0$ through another Markov chain with a learnable Gaussian transformation. A training process of the first prosodic predictive model and a process of determining the first prosodic feature based on the first prosodic predictive model will be described in detail below.

In some embodiments, training the first prosodic predictive model includes: performing noise-adding processing on a sample whole sentence prosodic feature based on the first prosodic predictive model and the overall prosodic change parameter to obtain a noise-added sample whole sentence prosodic feature; performing noise-reducing processing based on the overall prosodic change parameter and the noise-added sample whole sentence prosodic feature to obtain a noise-reduced sample whole sentence prosodic feature; determining a whole sentence prosodic loss function corresponding to the first prosodic predictive model based on the sample whole sentence prosodic feature and the noise-reduced sample whole sentence prosodic feature; and optimizing the whole sentence prosodic loss function based on a first optimization parameter of the whole sentence prosodic loss function.

In some examples, in the training process of the text-level prosodic predictor, when performing noise-adding processing on the sample whole sentence prosodic feature, the sample whole sentence prosodic feature may be subjected to gradual noise-adding according to the overall prosodic change parameter (i.e., time step, or diffusion times), i.e., the sample whole sentence prosodic feature $x_0$ is subjected to forward diffusion of T time steps to obtain the noise-added sample whole sentence prosodic feature $x_t$. The time step may be set according to actual situations. Reference may be made to formula (3) for the implementation of the forward noise-adding process:

$$q(x_t|x_{t-1}) = N(x_t; 1-\beta t \cdot x_{t-1}, \beta_t I) \qquad (3)$$

wherein $\beta_t$, is a variance parameter of the noise corresponding to the $t^{th}$ time step, $\beta_t$ may increase with the increase of the time step T; and I is an identity matrix.

After the completion of adding noise, reverse noise-reduction is performed on the noise-added sample whole sentence prosodic feature $x_t$. In the reverse noise-reducing process, the noise-added sample whole sentence prosodic feature $x_t$ is sampled in time step, and the noise-reduced sample whole sentence prosodic feature $\hat{x}_0$ is obtained through a neural network $\mu_\theta$ step by step. Reference may be made to formula (4) for the implementation of the reverse noise-reducing process:

$$p_\theta(x_{t-1}|x_t)=N(x_{t-1};\mu_\theta(x_t,t),\sigma_t^2) \tag{4}$$

wherein $\sigma_t^2$ is a noise coefficient, $\mu_\theta(x_t,t)$ is a neural network used for predicting the noise corresponding to the time step t; the neural network may be added residual connection and jump connection mechanism based on U-Net neural network (U-Convolution Neural Network), down-sample the whole sentence prosodic feature $x_0$ through multi-layer convolution network for multiple times, up-sample for multiple times for recovering, and added a transformer layer for self-supervision in the middle of down-sampling and up-sampling to improve the expression ability.

Then, the whole sentence prosodic loss function $L_1$ corresponding to the first prosodic predictive model is determined based on the sample whole sentence prosodic feature $x_0$ and the noise-reduced sample whole sentence prosodic feature $\hat{x}_0$, and the whole sentence prosodic loss function is optimized based on the first optimization parameter of the whole sentence prosodic loss function $L_1$. The neural network ye learns and predicts the noise corresponding to each time step through training data, and optimizes the first optimization parameter so that the predicted noise is as close as possible to the actually added noise. Reference may be made to formula (5) for the whole sentence prosodic loss function $L_1$:

$$L_1=E_{x_0 \sim q(x_0),t \sim u(1-T)}\|x_0-\hat{x}_0(x_t,\tilde{x}_0^{t+1},t,\theta)\|^2 \tag{5}$$

wherein $\tilde{x}_0^t$ is estimation of the sample whole sentence prosodic feature corresponding to the time step t, $\tilde{x}_0^{t+1}$ is estimation of the sample whole sentence prosodic feature corresponding to the previous time step, and $\theta$ is a first optimization parameter.

In some embodiments, the processing the response text and the emotional tag based on a first prosodic predictive model and an overall prosodic change parameter to obtain the first prosodic feature includes: encoding the emotional tag to obtain a whole sentence prosodic feature corresponding to the response text; and performing noise-reducing processing on the whole sentence prosodic feature based on the first prosodic predictive model and the overall prosodic change parameter to obtain the first prosodic feature.

In the process of inference based on the text-level prosodic predictor, the emotional tag obtained by the emotion classification module 230 is firstly encoded to obtain the whole sentence prosodic feature corresponding to the response text; and then noise-reducing processing is performed on the whole sentence prosodic feature based on the text-level prosodic predictor and the overall prosodic change parameter, so as to obtain a predictive value (i.e., a first prosodic feature) output by the text-level prosodic predictor.

By increasing or decreasing the time step of the text-level prosodic predictor, the effect of emotional expression of the first prosodic feature may be increased or decreased accordingly. Increasing the time step may make the text-level prosodic predictor have stronger noise-reducing ability on the input whole sentence prosodic feature, accuracy of the output first prosodic feature is higher and effect on the emotional expression is more significant. Therefore, the time step in the text-level prosodic predictor may be adjusted according to the emotion change of the user, for example, using a larger time step in the stage where the user's emotion is more negative; a smaller time step is used at the stage of the user's negative emotions diminishing to adjust the first prosodic feature with the user's emotion changes to improve the user experience.

Step 530: processing the response text and the first prosodic feature based on a second prosodic predictive model and a local prosodic change parameter to obtain the second prosodic feature.

In some embodiments, the speech synthesis module 250 further includes a second prosodic predictive model including a fundamental frequency predictor, an energy predictor and a duration predictor, which may model a fine-grained emotion (i.e., a character-level prosody) so as to obtain a second prosodic feature richer and accurately expressed on the emotion, and the second prosodic feature is used for characterizing the local prosodic feature of each character in the response text. The second prosodic predictive model may also be constructed based on the diffusion model as shown in FIG. 6. A training process of the second prosodic predictive model and a process of determining the second prosodic feature based on the second prosodic prediction model will be described in detail below.

Figure 7:
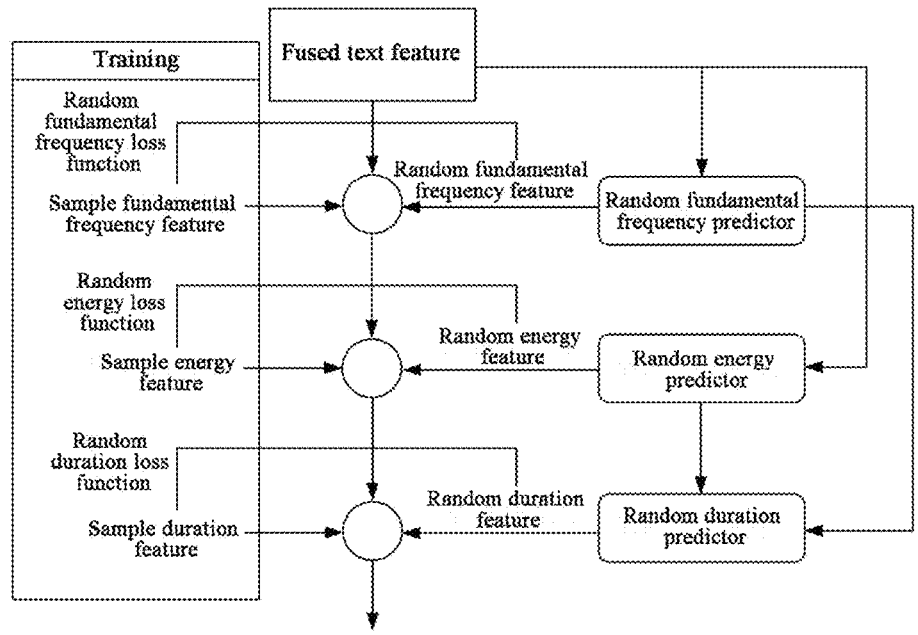
FIG. 7 is a schematic diagram showing a second prosodic predictive model according to some embodiments of the present disclosure.

FIG. 7 is a schematic diagram showing a second prosodic predictive model according to some embodiments of the present disclosure. As shown in FIG. 7, the process of training the second prosodic predictive model and obtaining the second prosodic feature based on the second prosodic predictive model may be performed simultaneously, i.e., the training process and the inference process of the second prosodic predictive model may be performed simultaneously.

In some embodiments, the processing the response text and the first prosodic feature based on a second prosodic predictive model and the local prosodic change parameter to obtain the second prosodic feature includes: encoding the response text based on the encoder to obtain response text features; fusing the first prosodic feature and the response text feature to obtain a fused text feature; the fused text feature is processed based on the random prosodic predictor and the local prosodic change parameters in the second prosodic predictive model to obtain a random prosodic feature corresponding to the fused text feature; the fused text feature is processed based on the fixed prosodic predictor in the second prosodic predictive model to obtain a fixed prosodic feature corresponding to the fused text feature; a second prosodic feature is determined based on the random prosodic feature, the fixed prosodic feature and the control coefficient.

The fused text feature is a response text feature containing a first prosodic feature; the second prosodic predictive model includes a random prosodic predictor and a fixed prosodic predictor; the random prosodic predictor includes a random fundamental frequency predictor, a random energy predictor and a random duration predictor; the fixed prosodic predictor includes a fixed fundamental frequency predictor, a fixed energy predictor and a fixed duration predictor; the random prosodic feature includes a random fundamental frequency feature, a random energy feature and a random duration feature; and the fixed prosodic feature includes a fixed fundamental frequency feature, a fixed energy feature, and a fixed duration feature.

Figure 8:
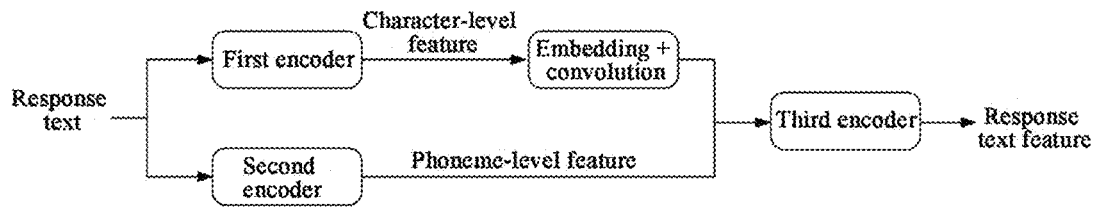
FIG. 8 is a schematic diagram showing an encoding process for text information according to some embodiments of the present disclosure.

FIG. 8 is a schematic diagram showing an encoding process for text information according to some embodiments of the present disclosure. As shown in FIG. 8, the response text may be encoded based on a first encoder (such as a Bert pre-training model, etc.) to obtain a character-level feature corresponding to the response text. The pre-trained bert language model may obtain a complex relationship between words and sentences, and generate a character-level feature corresponding to the response text. The character-level feature may reflect the complex prosodic information, which may effectively optimize the prosodic effect of the synthesized response speech. Further, the response text may be encoded based on a second encoder (e.g. an acoustic model based on deep learning, a speech recognition model, etc.) to obtain a phoneme-level feature corresponding to the response text. Then the character-level feature is mapped through an embedding and converted to the same dimension as the phoneme-level feature through a convolution network. Finally, a response text feature is obtained by encoding the feature obtained by adding the two based on a third encoder (i.e., a text encoder). It should be noted that the specific types of the first encoder, the second encoder and the third encoder are not limited in the embodiments of the present disclosure.

Then, the first prosodic feature and the response text feature are fused to obtain a fused text feature, i.e., the fused text feature is a response text feature containing the first prosodic feature. Then, the fused text feature is processed based on a random fundamental frequency predictor and a local prosodic change parameter (i.e., a time step, or called a diffusion number) to obtain a random fundamental frequency feature corresponding to the fused text feature; then the fused text feature predicted by the fundamental frequency is processed to obtain a random energy feature corresponding to the fused text features based on the random energy predictor and the local prosodic change parameter; then, the fused text feature predicted by the fundamental frequency and energy is processed based on the random duration predictor and the local prosodic change parameter to obtain a random duration feature corresponding to the fused text feature.

The process principle of processing the fused text feature based on the random fundamental frequency predictor, the random energy predictor and the random duration predictor to respectively obtain the random fundamental frequency feature, the random energy feature and the random duration feature is the same, which are all implemented by firstly performing noise-adding processing on the fused text feature according to the local prosodic change parameter to obtain the noise-added fused text feature; then according to the local prosodic change parameter, the noise-reducing processing is performed on the noise-added fused text feature to obtain a fused text feature with a random prosodic feature. Specific processes and related formulas may be referred to the corresponding embodiment of FIG. 6 described above and will not be described in detail herein.

In some embodiments, training the second prosodic predictive model includes: acquiring a sample response speech, acquiring sample fundamental frequency information, sample energy information and sample duration information corresponding to the sample response speech, and encoding the sample fundamental frequency information, the sample energy information and the sample duration information to obtain a sample local prosodic feature; determining a random prosodic loss function corresponding to the random prosodic predictor based on the sample local prosodic feature and the random prosodic feature, and optimizing the random prosodic predictor based on a second optimization parameter of the random prosodic loss function; and determining a fixed prosodic loss function corresponding to the fixed prosodic predictor based on the sample local prosodic feature and the fixed prosodic feature, and optimizing the fixed prosodic predictor based on a third optimization parameter of the fixed prosodic loss function.

The sample local prosodic feature includes a sample fundamental frequency feature, a sample energy feature and a sample duration feature; the random prosodic loss function includes a random fundamental frequency loss function, a random energy loss function and a random duration loss function, and the fixed prosodic loss function includes a fixed fundamental frequency loss function, a fixed energy loss function, and a fixed duration loss function.

Illustratively, at least one sample response speech may be obtained based on a sample speech database, and a fundamental frequency of the sample response speech may be extracted using a pysptk.sptk.rapt package, which is then subjected to clipping conversion and interpolation processing to obtain character-level sample fundamental frequency information. A Short-time Fourier Transform (STFT) operation is performed on the sample response speech using a librosa packet to obtain amplitude and phase information, and a sum of squares is taken for each column of the amplitude information, and is then taken a square root to obtain character-level sample energy information. In addition, the sample response speech is forcibly aligned with the sample response text corresponding to the sample response speech through a Monotonic Alignment Search (MAS) so as to obtain sample duration information corresponding to the sample response speech. Then, the obtained sample fundamental frequency information, sample energy information and sample duration information are encoded to obtain a sample fundamental frequency feature, a sample energy feature and a sample duration feature.

Illustratively, a random prosodic loss function corresponding to the random prosodic predictor may be determined based on the sample local prosodic feature and the random prosodic feature, and the random prosodic predictor may be optimized based on a second optimization parameter of the random prosodic loss function. For example, a random fundamental frequency loss function corresponding to the random fundamental frequency predictor may be determined based on a random fundamental frequency feature output by the random fundamental frequency predictor and a sample fundamental frequency feature; and a random energy loss function corresponding to the random energy predictor is determined based on the random energy feature and the sample energy feature output by the random energy predictor; and a random duration loss function corresponding to the random duration predictor is determined based on the random duration feature and the sample duration feature output by the random duration predictor.

The random fundamental frequency loss function, the random energy loss function or the random duration loss function may be determined with reference to formula (5) in the corresponding embodiment of FIG. 6, after performing noise addition and noise-reducing processing on the fused text feature $x_0$ to obtain the predicted random prosodic feature $\hat{x}_0$, the random prosodic loss function $L_2$ is determined based on the sample local prosodic feature $y_0$ and the predicted random prosodic feature $\hat{x}_0$, and the random prosodic loss function $L_2$ is optimized based on the second optimization parameter $\theta$. Reference may be made to formula (6) for determining the random prosodic loss function $L_2$:

$$L_2 = E_{y_0 \sim q(y_0), t \sim u(1-T)} \| y_0 - \hat{x}_0(x_t, x_0^{t'+1}, t, \theta) \|^2 \quad (6)$$

In some embodiments, in addition to determining the random prosodic feature, the fixed prosodic feature corresponding to fused text feature may also be determined based on the fixed prosodic predictor. The fixed fundamental frequency predictor/fixed energy predictor/fixed duration predictor may be a predictor including two layers of Long Short-Term Memory (LSTM) and one Fully Connected Layer, so that the output of the predictor has a relatively stable structure. After inputting the fused text feature into the fixed fundamental frequency predictor/fixed energy predictor/fixed duration predictor, the fixed fundamental frequency feature, the fixed energy feature and the fixed duration feature corresponding to the fused text feature may be obtained, respectively. Reference may be made for formula (7) for processing the fused text feature based on the fixed fundamental frequency predictor/fixed energy predictor/fixed duration predictor to obtain the fixed fundamental frequency feature/fixed energy feature/fixed duration feature corresponding to the fused text feature:

$$q_{\varphi}(x_0|w) = N(\text{Conv}(w), \sigma_0 I) \quad (7)$$

wherein w is a fused text feature, Conv(w) represents extraction of a fixed prosodic feature based on the fused text feature w by Convolutional Neural Networks (CNN). $\sigma_0 I$ is a diagonal covariance matrix and $\sigma_0$ is a variance constant. $q_{\varphi}(x_0|w)$ (i.e., $N(\text{Conv}(w), \sigma_0 I)$) is a Gaussian distribution, and a predictive value $x_0$ may be sampled based on the generated Gaussian distribution or Conv(w) may be directly used as a predictive value.

In addition, a fixed prosodic loss function corresponding to the fixed prosodic predictor may be determined based on the fixed prosodic feature predicted by the fixed prosodic predictor and the sample local prosodic feature, and the fixed prosodic predictor may be optimized based on a third optimization parameter in the fixed prosodic loss function. Reference may be made to formula (8) for determining the fixed prosodic loss function:

$$L_{fixed\ predictor} = \frac{1}{N} \sum_{i=1}^{N} (y_i - y_{pred,i})^2 \quad (8)$$

wherein $L_{fixed\ predictor}$ is a fixed prosodic loss function; N is a predicted number of times; $y_i$ is the $i^{th}$ sample local prosodic feature; and $y_{pred,i}$ is the $i^{th}$ predicted fixed prosodic feature, as Conv(w) in formula (7).

Illustratively, the fixed prosodic predictor may be optimized using an algorithm such as gradient descent. In optimizing the fixed prosodic predictor based on the gradient descent algorithm the third optimization parameter θ may be optimized based on the formula $$\theta \leftarrow \theta - \eta \frac{\partial L_{fixed\ predictor}}{\partial \theta}.$$

Wherein η is a learning rate, $$\frac{\partial L_{fixed\ predictor}}{\partial \theta}$$

is a gradient of the fixed prosodic loss function $L_{fixed\ predictor}$ to the third optimization parameter θ.

After the above-mentioned random prosodic loss function and the above-mentioned fixed prosodic loss function are determined, a loss function $L_{total} = L_2 + L_{fixed\ predictor}$ corresponding to the second prosodic predictive model may be determined. It will be appreciated that the random prosodic loss function and the fixed prosodic loss function are optimized, i.e., the second prosodic predictive model is optimized.

In some embodiments, the control coefficient includes a first control coefficient and a second control coefficient, and wherein the determining the second prosodic feature based on the random prosodic feature, the fixed prosodic feature and the control coefficient includes: determining the second prosodic feature based on the random prosodic feature, the fixed prosodic feature and the control coefficient; wherein the first control coefficient is used for determining weight of the random prosodic feature, and the second control coefficient is used for determining weight of the fixed prosodic feature.

After determining the random prosodic feature and the fixed prosodic feature, the weights of the random prosodic feature and the fixed prosodic feature may be adjusted respectively via the first control coefficient corresponding to the random prosodic feature and the second control coefficient corresponding to the fixed prosodic feature, so as to adjust the prosodic diversity and the stability of the prosodic feature respectively, and the second prosodic feature corresponding to the response text is determined. For example, the first control coefficient and the second control coefficient may be adjusted to appropriate values such that the subsequent local prosody of the generated response speech based on the random prosodic feature and the fixed prosodic feature has both good variability and good stability.

By using the above-mentioned solution, the present disclosure may make the predicted random prosodic feature have both an integral feature in the distribution and a one-to-many randomness using the intra-distribution sampling generation feature of the diffusion model itself, so that different prosodic features may be determined for the same response text. Meanwhile, the time step corresponding to the noise-reducing process may be controlled to control the degree of prosodic change accordingly, so that the naturalness and controllability of prosodic may be improved. In addition, while predicting the duration feature of the response text feature, the present disclosure also adds the prediction of the fundamental frequency and energy feature of the response text feature, so that the character-level prosodic feature of the response text may be determined together based on the fundamental frequency, energy and duration feature, and the emotional richness and naturalness of the character-level prosodic feature may be improved.

Step 140: generating and outputting the response speech corresponding to the interactive speech based on the response text, the first prosodic feature and the second prosodic feature.

In some embodiments, the speech synthesis module 250 further includes a speech synthesis model. After the above-mentioned first prosodic feature and the above-mentioned second prosodic feature are determined, a response text feature (i.e., a target text feature) containing the first prosodic feature and the second prosodic feature may be input into a speech synthesis model, and the speech synthesis model may determine a corresponding speech feature based on the target text feature, and generate a response speech corresponding to an interactive speech based on the speech feature. Finally, the response speech is output by the output module 260 to enable speech interaction with the user.

Figure 9:
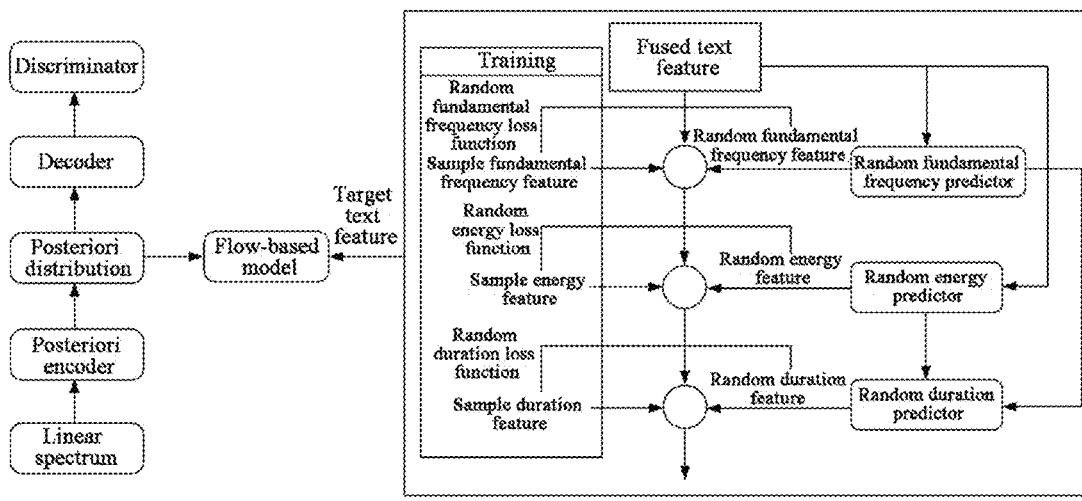
FIG. 9 is a schematic diagram showing a VITS model according to some embodiments of the present disclosure.

Illustratively, the speech synthesis model may be a Variational Inference with adversarial learning for end-to-end Text-to-Speech (VITS) model. FIG. 9 is a schematic diagram showing a VITS model according to some embodiments of the present disclosure. As shown in FIG. 9, the target text features determined based on the second prosodic predictive model may be input to flow-based models in the VITS model, so as to obtain a response speech feature corresponding to a target text feature based on the flow-based model; the response speech feature is then processed based on a Decoder in the VITS model to convert the response speech feature into corresponding audio waveforms, resulting in the response speech.

In some embodiments, with continued reference to FIG. 9, training the VITS model may improve the quality and naturalness of the generated response speech. For the training process of the VITS model, please refer to the following examples:

1. Audio Reconstruction Loss

The audio reconstruction loss is used to measure the difference between the Mel spectrum generated by the VITS model and the real Mel spectrum. For example, a linear spectrum corresponding to the training sample speech may be extracted first, and a Posteriori Encoder in the VITS model may acquire a Mel spectrum $y_{mel}$ corresponding to the training sample speech based on the linear spectrum corresponding to the training sample speech (the Mel spectrum is a real Mel spectrum of the training sample speech x); meanwhile, the posteriori encoder outputs an implicit feature z, a mean value and a variance corresponding to the implicit feature z based on the Mel spectrum $y_{mel}$, and generates a posteriori distribution $q_\phi(z|x)$ based on the mean value and the variance corresponding to the implicit feature z; finally, the implicit feature z is decoded into the estimated response speech $\hat{x}$ by the decoder and the Mel spectrum $\hat{y}_{mel}$ is extracted. Reference may be made to formula (9) for the loss function $L_r$ corresponding to the audio reconstruction:

$$Lr = \|y_{mel} - \hat{y}_{mel}\|_1 \quad (9)$$

2. KL Divergence Loss

The KL divergence loss is used to measure the difference between the posteriori distribution $q_\phi(z|x)$ and the conditional prior distribution $p_\theta(z|c,A)$. Reference may be made to formula (10) for the loss function $L_{kl}$ corresponding to KL divergence:

$$L_{kl} = \log q_\phi(z|x) - \log p_\theta(z|c,A) \quad (10)$$

wherein the conditional prior distribution $p_\theta(z|c,A)$ is a target text feature output by the second prosodic predictive model; after the target text feature is improved by a flow-based model, it is aligned with the above-mentioned implicit feature z output by the posteriori encoder to obtain an alignment matrix A.

3. Adversarial Training Loss

The adversarial training loss improves the quality of the generated response speech by introducing a discriminator D in the VITS model to distinguish between a real audio and a decoder generated synthesized audio. The adversarial training loss includes the following three parts:

a. Discriminator Loss

The discriminator loss is used to measure the discriminant power of the discriminator D for training sample speech x and synthesized audio G(z). The loss function $L_{adv}(D)$ corresponding to the discriminator loss may be described with reference to formula (11):

$$L_{adv}(D) = E_{x,z}[(D(x)-1)^2 + D(G(z))^2] \quad (11)$$

b. Generator Loss

The generator loss measures the ability of the synthesized audio G(z) to be discriminated by the discriminator D as training sample speech x. Reference may be made to formula (12) for the loss function $L_{adv}(G)$ corresponding to the generator loss:

$$L_{adv}(G) = E_z[(D(G(z))-1)^2] \quad (12)$$

c. Feature Matching Loss

Feature matching loss is used to measure the difference between synthesized audio G(z) and training sample speech x at different levels of features of the discriminator D. Reference may be made to formula (13) for the loss function $L_{fm}(G)$ corresponding to the feature matching loss:

$$L_{fm}(G) = E_{(x,z)}\left[\sum_{l=1}^{T} \frac{1}{N_l} \|D^l(x) - D^l(G(z))\|_1\right] \quad (13)$$

wherein $L_{fm}(G)$ is the number of layers of the discriminator network, $D^l$ is the feature of the $l^{th}$ layer of the discriminator, and $N_l$ is the number of features of the $l^{th}$ layer.

Through the above-mentioned solution, the audio reconstruction quality, the alignment of potential representation and the authenticity of generated audio in the VITS model are comprehensively considered, and the VITS model may generate high-quality and natural response speech by optimizing loss functions of the audio reconstruction loss, KL divergence loss and antagonistic training loss with an optimizing model.

With the technical solution of the present disclosure, an emotion classification module in a speech interaction system may perform emotion classification on interactive speech input by a user based on multiple modalities (a text modality and a speech modality), so as to make the emotion classification result to be more accurate. In addition, the speech synthesis module in the speech interaction system may determine the text-level prosodic feature (i.e., the whole sentence prosodic feature) and the character-level prosodic feature corresponding to the response text based on the response text corresponding to the interactive speech, so that the generated response speech may not only have a unified emotional style as a whole, but also have subtle emotional changes locally for different sentences.

Figure 10:
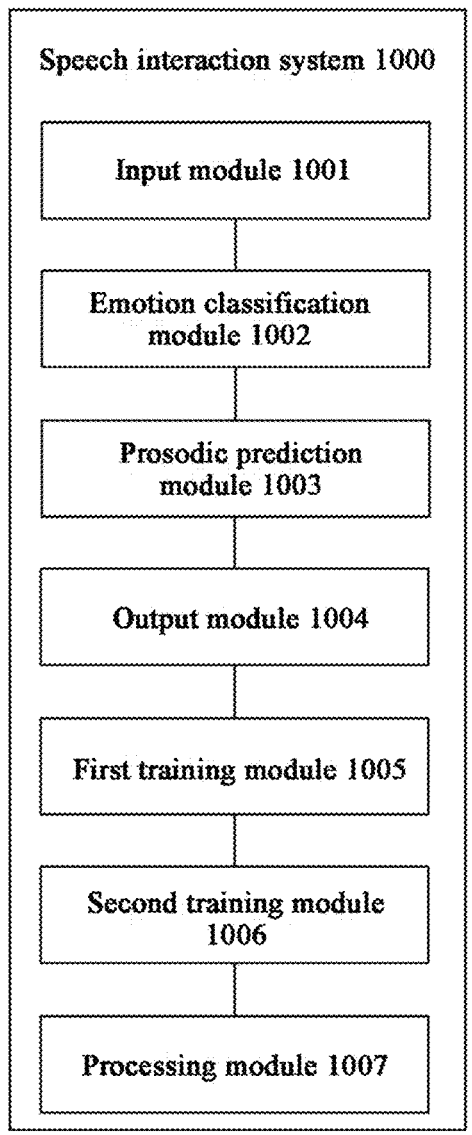
FIG. 10 is a schematic diagram showing another speech interaction system according to some embodiments of the present disclosure.

FIG. 10 is a schematic diagram showing another speech interaction system according to some embodiments of the present disclosure. As shown in FIG. 10, the speech interaction system 1000 includes an input module 1001, an emotion classification module 1002, a prosody prediction module 1003, and an output module 1004.

The input module 1001 is configured to receive interactive speech input by a user.

The emotion classification module 1002 is configured to determine an emotional tag corresponding to the interactive speech based on the interactive speech and interactive text corresponding to the interactive speech.

The prosodic prediction module 1003 is configured to determine, based on the emotional tag, a response text corresponding to the interactive text, and a first prosodic feature for characterizing the whole sentence prosodic feature of the response text and a second prosodic feature for characterizing a local prosodic feature of each character in the response text.

The output module 1004 is configured to generate and output a response speech corresponding to the interactive speech based on the response text, the first prosodic feature and the second prosodic feature.

In some embodiments, the emotion classification module 1002 is specifically configured to determine a text emotional feature based on the interactive speech and the interactive text, and determine a speech emotional feature based on the interactive speech, and determine the emotional tag based on the text emotional feature and the speech emotional feature.

In some embodiments, the emotion classification module 1002 is specifically configured to process the interactive speech based on a first emotional feature extraction model to obtain a whole sentence emotional feature; process the interactive text based on a second emotional feature extraction model to obtain a character emotional feature; and determine the text emotional feature based on the whole sentence emotional feature and the character emotional feature.

In some embodiments, the emotion classification module 1002 is specifically configured to process the interactive speech based on a first emotional feature extraction model to obtain an implicit speech emotional feature; process the interactive speech based on a third emotional feature extraction model to obtain an explicit speech emotional feature; and determine the speech emotional feature based on the implicit speech emotional feature and the explicit speech emotional feature.

In some embodiments, the prosodic prediction module 1003 is specifically configured to generate the response text corresponding to the emotional tag based on the emotional tag; process the response text and the emotional tag based on a first prosodic predictive model and an overall prosodic change parameter to obtain the first prosodic feature; and process the response text and the first prosodic feature based on a second prosodic predictive model and a local prosodic change parameter to obtain the second prosodic feature.

In some embodiments, the prosodic prediction module 1003 is specifically configured to encode the emotional tag to obtain a whole sentence prosodic feature corresponding to the response text; and perform noise-reducing processing on the whole sentence prosodic feature based on the first prosodic predictive model and the overall prosodic change parameter to obtain the first prosodic feature.

As shown in FIG. 10, the speech interaction system 1000 further includes a first training module 1005.

In some embodiments, the first training module 1005 is configured to perform noise-adding processing on a sample whole sentence prosodic feature based on the first prosodic predictive model and the overall prosodic change parameter to obtain a noise-added sample whole sentence prosodic feature; perform noise-reducing processing based on the overall prosodic change parameter and the noise-added sample whole sentence prosodic feature to obtain a noise-reduced sample whole sentence prosodic feature; determine a whole sentence prosodic loss function corresponding to the first prosodic predictive model based on the sample whole sentence prosodic feature and the noise-reduced sample whole sentence prosodic feature; and optimize the whole sentence prosodic loss function based on a first optimization parameter of the whole sentence prosodic loss function.

In some embodiments, the prosodic prediction module 1003 is specifically configured to encode the response text based on an encoder to obtain a response text feature; fuse the first prosodic feature and the response text feature to obtain a fused text feature as a response text feature including the first prosodic feature; process the fused text feature based on the random prosodic predictor in the second prosodic predictive model and the local prosodic change parameter to obtain the random prosodic feature corresponding to the fused text feature; where the random prosodic feature includes a random fundamental frequency feature, a random energy feature and a random duration feature; process the fused text feature based on a fixed prosodic predictor in the second prosodic predictive model to obtain a fixed prosodic feature corresponding to the fused text feature, wherein the fixed prosodic feature includes a fixed fundamental frequency feature, a fixed energy feature and a fixed duration feature; and determine the second prosodic feature based on the random prosodic feature, the fixed prosodic feature and a control coefficient.

In some embodiments, the prosodic prediction module 1003 is specifically configured to perform noise-adding processing on the fused text feature based on the random prosodic predictor and the local prosodic change parameter to obtain a noise-added fused text feature; and perform noise-reducing processing on the noise-added fused text feature based on the random prosodic predictor and the local prosodic change parameter to obtain the random prosodic feature.

In some embodiments, the prosodic prediction module 1003 is specifically configured to process the fused text feature based on a random fundamental frequency predictor in the random prosodic predictor and the local prosodic change parameter to obtain the random fundamental frequency feature; process the fused text feature and the random fundamental frequency feature based on a random energy predictor in the random prosodic predictor and the local prosodic change parameter to obtain the random energy feature; process the fused text feature, the random fundamental frequency feature and the random energy feature based on a random duration predictor in the random prosodic predictor and the local prosodic change parameter to obtain the random duration feature; and determine the random prosodic feature based on the random fundamental frequency feature, the random energy feature, and the random duration feature.

In some embodiments, the control coefficient includes a first control coefficient for determining weight of the random prosodic feature and a second control coefficient for determining weight of the fixed prosodic feature, and the prosodic prediction module 1003 is specifically configured to determine the second prosodic feature based on the first control coefficient, the second control coefficient, the random prosodic feature and the fixed prosodic feature.

As shown in FIG. 10, the speech interaction system 1000 further includes a second training module 1006.

In some embodiments, the second training module 1006 is configured to acquire a sample response speech;
  acquire a sample response speech; acquire sample fundamental frequency information, sample energy information and sample duration information corresponding to the sample response speech, and encode the sample fundamental frequency information, the sample energy information and the sample duration information to obtain a sample local prosodic feature including a sample fundamental frequency feature, a sample energy feature and a sample duration feature; determine a random prosodic loss function corresponding to the random prosodic predictor based on the sample local prosodic feature and the random prosodic feature, and optimize the random prosodic predictor based on a second optimization parameter of the random prosodic loss function including a random fundamental frequency loss function, a random energy loss function and a random duration loss function; and determine a fixed prosodic loss function corresponding to the fixed prosodic predictor based on the sample local prosodic feature and the fixed prosodic feature, and optimize the fixed prosodic predictor based on a third optimization parameter of the fixed prosodic loss function including a fixed fundamental frequency loss function, a fixed energy loss function and a fixed duration loss function.

In some embodiments, the prosodic prediction module 1003 is specifically configured to encode the response text based on a first encoder to obtain a character-level feature corresponding to the response text; encode the response text based on a second encoder to obtain a phoneme-level feature corresponding to the response text; and encode a feature obtained by adding the character-level feature and the phoneme-level feature based on a third encoder to obtain the response text feature.

In some embodiments, the output module 1004 is specifically configured to determine a speech feature based on the first prosodic feature, the second prosodic feature and the response text feature; and generate and output the response speech based on the speech feature.

As shown in FIG. 10, the speech interaction system 1000 further includes a processing module 1007.

In some embodiments, the processing module 1007 is configured to perform speech recognition processing on the interactive speech to obtain an interactive text corresponding to the interactive speech; and processing the interactive text based on the language model to obtain a response text corresponding to the interactive text.

Figure 11:
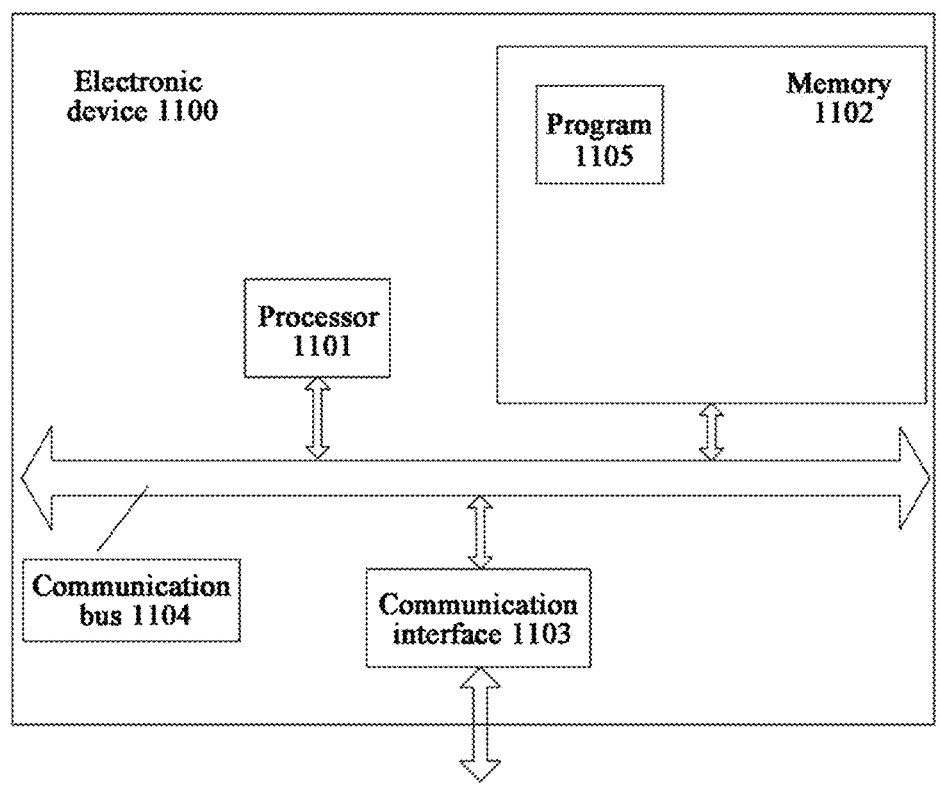
FIG. 11 is a schematic diagram showing an electronic device according to some embodiments of the present disclosure.

FIG. 11 is a schematic diagram showing an electronic device according to some embodiments of the present disclosure. In some embodiments, the electronic device includes one or more processors and memory. The memory is configured to store one or more programs. When the one or more programs are executed by the one or more processors, the one or more processors implement the speech interaction method in the above-described embodiment.

As shown in FIG. 11, the electronic device 1100 includes: a processor 1101 and a memory 1102. Illustratively, the electronic device 1100 may further include: a Communications Interface 1103 and a communication bus 1104.

The processor 1101, the memory 1102 and the communication interface 1103 communicate with each other via the communication bus 1104. The communication interface 1103 is used for communicating with network elements of other devices such as a network element of a client or other servers, etc.

In some embodiments, the processor 1101 is configured to execute the program 1105, which in particular may perform the relevant steps of the speech interaction method embodiments described above. In particular, program 1105 may include program code including computer-executable instructions.

Illustratively, the processor 1101 may be a central processor CPU, or an Application Specific Integrated Circuit (ASIC), or one or more integrated circuits configured to implement some embodiments of the present disclosure. The electronic device 1100 may include one or more processors, which may be of the same type, such as one or more CPUs; it may also be a different type of processor, such as one or more CPUs and one or more ASICs.

In some embodiments, the memory 1102 is used for storing program 1105. The memory 1102 may include high-speed RAM memory, and may further include Non-Volatile Memory (NVM), such as at least one disk memory.

The program 1105 may be specifically invoked by the processor 1101 to cause the electronic device 1100 to perform speech interaction method operation.

Some embodiments of the present disclosure provide a computer-readable storage medium having stored thereon at least one executable instruction that, when executed on the electronic device 1100, causes the electronic device 1100 to perform the speech interaction method in the embodiments described above.

The executable instructions may be embodied to cause the electronic device 1100 to perform speech interaction method operations.

For example, the computer-readable storage medium may be a Read-Only Memory (ROM), a Random Access Memory (RAM), a Compact Disc Read-Only Memory (CD-ROM), a magnetic tape, a floppy disk, an optical data storage device, etc.

Benefits that may be achieved by the computer-readable storage medium provided by some embodiments of the present disclosure may be referred to in the corresponding speech interaction methods provided above and will not be described in detail herein.

It should be noted that relational terms such as first and second, and the like, may be used herein to distinguish one entity or action from another entity or action without necessarily requiring or implying any actual such relationship or order between such entities or actions. Further, the terms "include", "including", or any other variation thereof, are intended to cover a non-exclusive inclusion, such that a process, method, article, or device that includes a list of elements does not include only those elements but may include other elements not expressly listed or inherent to such process, method, article, or device. An element defined by the phrase "includes a . . . " without more constraints does not preclude the existence of additional identical elements in the process, method, article, or device that includes the element.

The various embodiments of the description are described in a related manner, reference being made to the same and similar parts of the various embodiments, and each of the embodiments focuses on the differences from the other embodiments. In particular, for the apparatus embodiment, since it is substantially similar to the method embodiment, the description is relatively simple, and reference may be made to the partial description of the method embodiment for relevant points.

The logic and/or steps represented in the flowcharts or otherwise described herein, such as an ordered listing of executable instructions that may be considered to implement logical functions, may be embodied in any computer-readable medium for use by or in connection with an instruction execution system, apparatus, or device, such as a computer-based system, processor-containing system, or other system that may fetch the instructions from the instruction execution system, apparatus, or device and execute the instructions.

For the purposes of this specification, a "computer-readable medium" may be any means that may contain, store, communicate, propagate, or transport the program for use by or in connection with the instruction execution system, apparatus, or device.

More specific examples (a non-exhaustive list) of computer-readable media include: an electrical connection (electronic device) having one or more wirings, a portable computer disc cartridge (magnetic device), a random-access memory (RAM), a read-only memory (ROM), an erasable programmable read-only memory (EPROM or flash memory), an optical fiber device, and a portable optical disc read-only memory (CDROM).

In addition, the computer-readable medium may even be paper or other suitable medium upon which the program is printed, as the program may be electronically obtained, such as by optically scanning the paper or other medium, followed by editing, interpreting, or otherwise processing in a suitable manner if necessary, and then stored in a computer memory. It is to be appreciated that portions of the present disclosure may be implemented in hardware, software, firmware, or a combination thereof.

In the embodiments described above, the steps or methods may be implemented in software or firmware stored in memory and executed by a suitable instruction execution system. For example, if implemented in hardware, as in another embodiment, it may be implemented using any one or a combination of the following techniques known in the art: discrete logic circuits with logic gates for implementing logic functions on data signals, application specific integrated circuits with appropriate combinational logic gates, programmable gate arrays (PGAs), field programmable gate arrays (FPGAs), etc.

The above-described embodiments of the present disclosure are not to be construed as limiting the scope of the present disclosure.

What is claimed is:

1. A speech interaction method, comprising:
receiving interactive speech input by a user;
determining an emotional tag corresponding to the interactive speech based on the interactive speech and an interactive text corresponding to the interactive speech;
generating a response text corresponding to the emotional tag based on the emotional tag;
processing the response text and the emotional tag based on a first prosodic predictive model and an overall prosodic change parameter to obtain a first prosodic feature for characterizing a whole sentence prosodic feature of the response text;
encoding the response text based on an encoder to obtain a response text feature;
fusing the first prosodic feature and the response text feature to obtain a fused text feature as a response text feature comprising the first prosodic feature;
processing the fused text feature based on a random prosodic predictor in a second prosodic predictive model and a local prosodic change parameter to obtain a random prosodic feature corresponding to the fused text feature;
processing the fused text feature based on a fixed prosodic predictor in the second prosodic predictive model to obtain a fixed prosodic feature corresponding to the fused text feature; and
determining, based on the random prosodic feature, the fixed prosodic feature and a control coefficient, a second prosodic feature for characterizing a local prosodic feature of each character in the response text; and
generating and outputting a response speech corresponding to the interactive speech based on the response text, the first prosodic feature and the second prosodic feature.

2. The method according to claim 1, wherein the determining the emotional tag corresponding to the interactive speech based on the interactive speech and interactive text corresponding to the interactive speech comprises:
determining a text emotional feature based on the interactive speech and the interactive text, and determining a speech emotional feature based on the interactive speech; and
determining the emotional tag based on the text emotional feature and the speech emotional feature.

3. The method according to claim 2, wherein the determining the text emotional feature based on the interactive speech and the interactive text comprises:
processing the interactive speech based on a first emotional feature extraction model to obtain a whole sentence emotional feature;
processing the interactive text based on a second emotional feature extraction model to obtain a character emotional feature; and
determining the text emotional feature based on the whole sentence emotional feature and the character emotional feature.

4. The method according to claim 2, wherein the determining the speech emotional feature based on the interactive speech comprises:
processing the interactive speech based on a first emotional feature extraction model to obtain an implicit speech emotional feature;
processing the interactive speech based on a third emotional feature extraction model to obtain an explicit speech emotional feature; and
determining the speech emotional feature based on the implicit speech emotional feature and the explicit speech emotional feature.

5. The method according to claim 1, wherein the processing the response text and the emotional tag based on the first prosodic predictive model and the overall prosodic change parameter to obtain the first prosodic feature comprises:
encoding the emotional tag to obtain a whole sentence prosodic feature corresponding to the response text; and
performing noise-reducing processing on the whole sentence prosodic feature based on the first prosodic predictive model and the overall prosodic change parameter to obtain the first prosodic feature.

6. The method according to claim 5, further comprising:
performing noise-adding processing on a sample whole sentence prosodic feature based on the first prosodic predictive model and the overall prosodic change parameter to obtain a noise-added sample whole sentence prosodic feature;
performing noise-reducing processing based on the overall prosodic change parameter and the noise-added sample whole sentence prosodic feature to obtain a noise-reduced sample whole sentence prosodic feature;
determining a whole sentence prosodic loss function corresponding to the first prosodic predictive model based on the sample whole sentence prosodic feature and the noise-reduced sample whole sentence prosodic feature; and
optimizing the whole sentence prosodic loss function based on a first optimization parameter of the whole sentence prosodic loss function.

7. The method according to claim 1, wherein the random prosodic feature comprises a random fundamental frequency feature, a random energy feature and a random duration feature; and
wherein the fixed prosodic feature comprises a fixed fundamental frequency feature, a fixed energy feature and a fixed duration feature.

8. The method according to claim 7, wherein the processing the fused text feature based on the random prosodic predictor in the second prosodic predictive model and the local prosodic change parameter to obtain the random prosodic feature corresponding to the fused text feature comprises:
  processing the fused text feature based on a random fundamental frequency predictor in the random prosodic predictor and the local prosodic change parameter to obtain the random fundamental frequency feature;
  processing the fused text feature and the random fundamental frequency feature based on a random energy predictor in the random prosodic predictor and the local prosodic change parameter to obtain the random energy feature;
  processing the fused text feature, the random fundamental frequency feature and the random energy feature based on a random duration predictor in the random prosodic predictor and the local prosodic change parameter to obtain the random duration feature; and
  determining the random prosodic feature based on the random fundamental frequency feature, the random energy feature, and the random duration feature.

9. The method according to claim 1, wherein the processing the fused text feature based on the random prosodic predictor in the second prosodic predictive model and the local prosodic change parameter to obtain the random prosodic feature corresponding to the fused text feature comprises:
  performing noise-adding processing on the fused text feature based on the random prosodic predictor and the local prosodic change parameter to obtain a noise-added fused text feature; and
  performing noise-reducing processing on the noise-added fused text feature based on the random prosodic predictor and the local prosodic change parameter to obtain the random prosodic feature.

10. The method according to claim 1, wherein the control coefficient comprises a first control coefficient and a second control coefficient, and wherein the determining the second prosodic feature based on the random prosodic feature, the fixed prosodic feature and the control coefficient comprises:
  determining the second prosodic feature based on the first control coefficient for determining weight of the random prosodic feature, the second control coefficient for determining weight of the fixed prosodic feature, the random prosodic feature and the fixed prosodic feature.

11. The method according to claim 1, further comprising:
  acquiring a sample response speech;
  acquiring sample fundamental frequency information, sample energy information and sample duration information corresponding to the sample response speech, and encoding the sample fundamental frequency information, the sample energy information and the sample duration information to obtain a sample local prosodic feature comprising a sample fundamental frequency feature, a sample energy feature and a sample duration feature;
  determining a random prosodic loss function corresponding to the random prosodic predictor based on the sample local prosodic feature and the random prosodic feature, and optimizing the random prosodic predictor based on a second optimization parameter of the random prosodic loss function comprising a random fundamental frequency loss function, a random energy loss function and a random duration loss function; and
  determining a fixed prosodic loss function corresponding to the fixed prosodic predictor based on the sample local prosodic feature and the fixed prosodic feature, and optimizing the fixed prosodic predictor based on a third optimization parameter of the fixed prosodic loss function comprising a fixed fundamental frequency loss function, a fixed energy loss function and a fixed duration loss function.

12. The method according to claim 1, wherein the encoding the response text based on the encoder to obtain the response text feature comprises:
  encoding the response text based on a first encoder to obtain a character-level feature corresponding to the response text;
  encoding the response text based on a second encoder to obtain a phoneme-level feature corresponding to the response text; and
  encoding a feature obtained by adding the character-level feature and the phoneme-level feature based on a third encoder to obtain the response text feature.

13. The method according to claim 1, wherein the generating and outputting the response speech corresponding to the interactive speech based on the response text, the first prosodic feature and the second prosodic feature comprises:
  determining a speech feature based on the first prosodic feature, the second prosodic feature and the response text feature; and
  generating and outputting the response speech based on the speech feature.

14. The method according to claim 1, wherein after the receiving the interactive speech input by the user, the method further comprises:
  performing speech recognition processing on the interactive speech to obtain the interactive text corresponding to the interactive speech;
  wherein after the determining the emotional tag corresponding to the interactive speech, the method further comprises:
  processing the interactive text based on a language model to obtain the response text corresponding to the interactive text.

15. A non-transitory computer-readable storage medium storing a computer program thereon, which, when executed by a processor, cause the processor to implement the speech interaction method according to claim 1.

16. A computer program product, comprising a computer program stored on a non-transitory computer-readable storage medium, the computer program comprising program instructions which, when executed by a computer, cause the computer to perform the speech interaction method according to claim 1.

17. A speech interaction system, comprising:
  an input module configured to receive interactive speech input by a user;
  an emotion classification module configured to determine an emotional tag corresponding to the interactive speech based on the interactive speech and an interactive text corresponding to the interactive speech;
  a prosodic prediction module configured to: generate a response text corresponding to the emotional tag based on the emotional tag; process the response text and the emotional tag based on a first prosodic predictive model and an overall prosodic change parameter to obtain a first prosodic feature for characterizing a whole sentence prosodic feature of the response text; encode the response text based on an encoder to obtain a response text feature; fuse the first prosodic feature and the response text feature to obtain a fused text feature as a response text feature comprising the first prosodic feature; process the fused text feature based on a random prosodic predictor in a second prosodic predictive model and a local prosodic change parameter to obtain a random prosodic feature corresponding to the fused text feature; process the fused text feature based on a fixed prosodic predictor in the second prosodic predictive model to obtain a fixed prosodic feature corresponding to the fused text feature; and determine, based on the random prosodic feature, the fixed prosodic feature and a control coefficient, a second prosodic feature for characterizing a local prosodic feature of each character in the response text; and an output module configured to generate and output a response speech corresponding to the interactive speech based on the response text, the first prosodic feature and the second prosodic feature.

* * * * *